(12) United States Patent
Mildh et al.

(10) Patent No.: US 12,513,568 B2
(45) Date of Patent: Dec. 30, 2025

(54) PROVIDING DATA IN A PDCP MESSAGE

(71) Applicant: Telefonaktiebolaget LM Ericsson (publ), Stockholm (SE)

(72) Inventors: Gunner Mildh, Sollentuna (SE); Oumer Teyeb, Montréal (CA); Jari Vikberg, Järna (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 375 days.

(21) Appl. No.: 18/024,799

(22) PCT Filed: Sep. 22, 2020

(86) PCT No.: PCT/SE2020/050887
§ 371 (c)(1),
(2) Date: Mar. 6, 2023

(87) PCT Pub. No.: WO2022/066069
PCT Pub. Date: Mar. 31, 2022

(65) Prior Publication Data
US 2023/0328588 A1    Oct. 12, 2023

(51) Int. Cl.
*H04W 28/06* (2009.01)

(52) U.S. Cl.
CPC .................................. *H04W 28/06* (2013.01)

(58) Field of Classification Search
None
See application file for complete search history.

(56) References Cited

U.S. PATENT DOCUMENTS

| | | | |
|---|---|---|---|
| 2009/0016301 A1 | 1/2009 | Sammour et al. | |
| 2015/0215827 A1 | 7/2015 | Zhang et al. | |
| 2020/0275519 A1* | 8/2020 | Sharma | H04W 12/04 |
| 2021/0014339 A1* | 1/2021 | Zhang | H04W 28/06 |
| 2021/0392467 A1* | 12/2021 | Kim | H04W 76/40 |
| 2022/0329543 A1* | 10/2022 | Yao | H04L 49/90 |

FOREIGN PATENT DOCUMENTS

WO    2019066628 A1    4/2019

OTHER PUBLICATIONS

International Search Report and Written Opinion of the International Searching Authority, PCT/SE2020/050887, mailed Jun. 7, 2021, 13 pages.
Huawei et al., "PDCP reordering disabling and enabling," 3GPP TSG-RAN WG2 Ad Hoc, R2-1707252, Qingdao, China, Jun. 27-29, 2017, 6 pages.

(Continued)

*Primary Examiner* — Walter J Divito
(74) *Attorney, Agent, or Firm* — Sage Patent Group

(57) ABSTRACT

Methods and apparatus are provided. In an example aspect, a method in a User Equipment (UE) of providing data in a PDCP message to a layer above a PDCP layer is provided. The method includes receiving an indication that a PDCP message received at the UE should bypass a PDCP reordering process, and providing data in the PDCP message to a layer above a PDCP layer without using the PDCP reordering process.

24 Claims, 6 Drawing Sheets

(56) References Cited

OTHER PUBLICATIONS

Sequans Communications, "Disabling of PDCP reordering," 3GPP TSG RAN WG2 NR AdHoc, R2-1707443, Qingdao, China, Jun. 27-29, 2017, 3 pages.
3GPP TS 38.323 v16.1.0 (Jul. 2020); 3rd Generation Partnership Project; Technical Specification Group Radio Access Network; NR; Packet Data Convergence Protocol (PDCP) specification (Release 16), 40 pages.
3GPP TS 38.401 v16.2.0 (Jul. 2020); 3rd Generation Partnership Project; Technical Specification Group Radio Access Network; NG-RAN; Architecture design (Release 16), 77 pages.
3GPP TS 38.423 v16.2.0 (Jul. 2020); 3rd Generation Partnership Project; Technical Specification Group Radio Access Network; NG-RAN; Xn application protocol (XnAP) (Release 16), 447 pages.
3GPP TS 38.463 v16.2.0 (Jul. 2020); 3rd Generation Partnership Project; Technical Specification Group Radio Access Network; NG-RAN; E1 Application Protocol (E1AP) (Release 16), 230 pages.
ETSI TS 138 331 v16.1.0 (Jul. 2020); Technical Specification; 5G, NR; Radio Resource Control (RRC); Protocol specification (3GPP TS 38.331 version 16.1.0 Release 16), 886 pages.
3GPP TS 33.501 v16.3.0 (Jul. 2020); 3rd Generation Partnership Project; Technical Specification Group Services and System Aspects; Security architecture and procedures for 5G system (Release 16), 248 pages.

* cited by examiner

Sending an indication to a User Equipment (UE) that a PDCP message sent to the UE should bypass a PDCP reordering process at the UE to cause the UE to provide data in the PDCP message to a layer above a PDCP layer in the UE without using the PDCP reordering process ∼ 1102
1100
FIG. 11
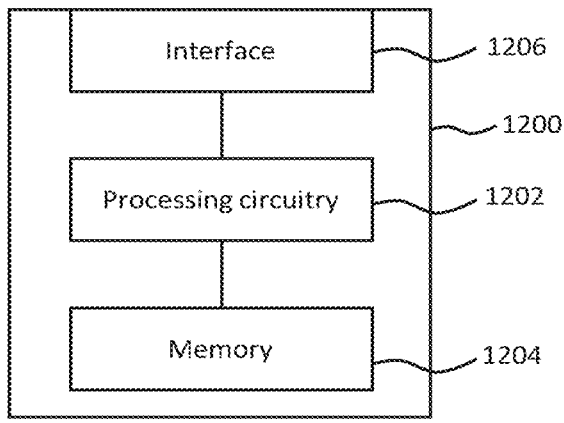
FIG. 12
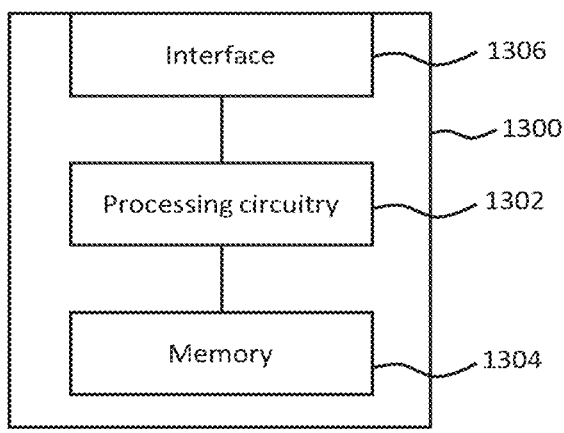
FIG. 13

PROVIDING DATA IN A PDCP MESSAGE

CROSS REFERENCE TO RELATED APPLICATIONS

This application is a 35 U.S.C. § 371 national stage application of PCT International Application No. PCT/SE2020/050887 filed on Sep. 22, 2020, the disclosure and content of which is incorporated by reference herein in its entirety.

TECHNICAL FIELD

Examples of the present disclosure relate to providing data in a PDCP message, for example a User Equipment (UE) providing data in a PDCP message to a layer above a PDCP layer.

BACKGROUND

The 5th generation (5G) New Radio (NR) cellular telecommunication system aims at supporting Ultra Reliable Low Latency Communication (URLLC). Examples of features of URLLC include PDCP duplication functionality to increase reliability, as well as make before break handover procedures to ensure minimal interruption time at handover, where a UE switches from one cell or beam to another.

Typical deployments of 5G NR systems are expected in the future to utilize cloud infrastructure that supports 5G Core Network and upper Radio Access Network (RAN) functionality such as the 3GPP defined gNodeB-Central unit-Control Plane (gNB-CU-CP) functionality. The cloud infrastructure differs in reliability from typical dedicated or specialized hardware which has traditionally been used to support cellular network functions. One such difference is the availability of the underlying hardware, which may be significantly less reliable for generic off the shelf cloud hardware compared to traditional dedicated hardware. Therefore, cloud deployment of telecommunication functions may introduce mechanisms for dealing with failures of the cloud infrastructure. Examples of such mechanisms include using distributed databases to provide persistent storage even in the case of failure of one or more hardware nodes supporting this database.

Methods for ensuring reliable connections to UEs using URLLC may include setting up parallel user plane connections to the same UE, so that if one of the user plane connections is lost, it may be possible to continue data transmission via the other connection(s). Multiple user plane connections may be supported either using a single control plane connection (e.g. RRC, NAS connection), or with two independent control plane connections, which in turn requires that the device has dual radio capability and is able to set up two independent radio connections, which typically increases the cost of the UE. The latter solution also increases network complexity, as the network would need to both understand that the two control plane connections are related, and to ensure that these devices are steered to using different network resources to avoid single point of failure.

FIG. 1 illustrates an example scenario 100 for end to end redundant User Plane paths using Dual Connectivity. For example, FIG. 1 illustrates user plane resource configuration of dual PDU sessions when redundancy is applied. One Protocol Data Unit (PDU) Session 102 spans from the UE via Master NG-RAN node to a first User Plane Function (UPF1) acting as the PDU Session Anchor, and the other PDU Session 104 spans from the UE via Secondary NG-RAN node to UPF2 acting as the PDU Session Anchor. As described in 3GPP Technical Specification (TS) 37.340, which is incorporated herein by reference, a NG-RAN may realize redundant user plane resources for the two PDU sessions with two NG-RAN nodes (i.e. Master NG-RAN and Secondary NG-RAN as shown in FIG. 1) or a single NG-RAN node. In both cases, there is a single N2 interface towards AMF from the Master NG-RAN node.

Based on these two PDU Sessions 102 and 104, two independent user plane paths are set up. UPF1 and UPF2 connect to the same Data Network (DN), even though the traffic via UPF1 and UPF2 may be routed via different user plane nodes within the DN.

The 5G RAN architecture 200 is described in 3GPP TS 38.401, which is incorporated herein by reference, and is illustrated in FIG. 2. The NG architecture can be further described as follows:

The NG-RAN consists of a set of gNBs connected to the 5GC through the NG interface.

A gNB can support FDD mode, TDD mode or dual mode operation.

gNBs can be interconnected through the Xn interface.

A gNB may consist of a gNB-CU (central unit) and one or more gNB-DUs (distributed units).

A gNB-CU and a gNB-DU are connected via F1 logical interface.

A gNB-DU is connected to only one gNB-CU.

NG, Xn and F1 are logical interfaces. For NG-RAN, the NG and Xn-C interfaces for a gNB consisting of a gNB-CU and gNB-DUs terminate in the gNB-CU. For E-UTRAN-New Radio Dual Connectivity (EN-DC), the S1-U and X2-C interfaces for a gNB consisting of a gNB-CU and gNB-DUs terminate in the gNB-CU. The gNB-CU and connected gNB-DUs are only visible to other gNBs and the core network (5GC) as a gNB.

The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1) the related TNL protocol and functionality are specified. The TNL provides services for user plane transport and signalling transport. In NG-Flex configuration, each gNB is connected to all Access and Mobility Management Functions (AMFs) within an AMF Region. The AMF Region is defined in 3GPP TS 23.501, which is incorporated herein by reference.

An open interface has been specified between the control plane (CU-CP) and the user plane (CU-UP) parts of the central unit (CU). The related specification is 3GPP TS 38.463, which is incorporated herein by reference. The open interface between CU-CP and CU-UP is named E1. The architecture is shown in FIG. 3, which illustrates a split gNB architecture. Three deployment scenarios for the split gNB are shown in 3GPP Technical Report (TR) 38.806, which is incorporated herein by reference:

Scenario 1: CU-CP and CU-UP centralized;
Scenario 2: CU-CP distributed and CU-UP centralized;
Scenario 3: CU-CP centralized and CU-UP distributed.

The E1 application protocol (E1AP) is defined in TS 38.463. The E1AP defines the messages that are exchanged between the CU-CP and the CU-UP for the sake of providing user-plane services to the UE.

In LTE and NR, the Radio Resource Control (RRC) protocol is used to setup, configure and maintain the radio connection between the UE and an eNB or gNB. When the UE receives an RRC message from the eNB or gNB, it will apply or "compile" the configuration, and if this succeeds the UE generates an RRC complete message that indicates the transaction ID of the message that triggered this response.

Since LTE-release 8 (rel-8), three Signaling Radio Bearers (SRBs), namely SRB0, SRB1 and SRB2, have been available for the transport of RRC and Non Access Stratum (NAS) messages between the UE and the eNB. A new SRB, known as SRB1bis, was also introduced in rel-13 for supporting DoNAS (Data Over NAS) in narrowband-Internet of Things (NB-IoT). SRB0 is for RRC messages using the CCCH logical channel, and is used for handling RRC connection setup, RRC connection resume and RRC connection re-establishment. Once the UE is connected to the eNB (i.e. RRC connection setup or RRC connection reestablishment/resume has succeeded), SRB1 is used for handling RRC messages (which may include a piggybacked NAS message) as well as for NAS messages prior to the establishment of SRB2, all using the DCCH logical channel. SRB2 is for RRC messages which include logged measurement information as well as for NAS messages, all using the DCCH logical channel. SRB2 has a lower priority than SRB1, because logged measurement information and NAS messages can be lengthy and could cause the blocking of more urgent and smaller SRB1 messages. SRB2 is always configured by E-UTRAN after security activation.

In rel-15, for the case of dual connectivity (LTE as the master node while NR is the secondary node, or vice versa, as well as dual connectivity using two NR nodes), split SRBs are introduced, where SRB1/2 can be transported via the radio resources of the master node or the secondary node (with the protocol being terminated at the master node). Additionally, a new SRB called SRB3 is introduced (if the secondary node is NR), that is used to directly transfer RRC messages from the secondary node to the UE for those messages that do not require co-ordination with the master node.

The majority of the RRC procedures are initiated by the network, e.g. to re-configure some behavior of the UE such as measurement reporting configuration, lower layer configuration, radio bearer configuration, etc. Typically the UE acknowledges the RRC message from the network with an RRC reply message indicating that the new configuration has been adopted. Some RRC procedures are also initiated by the UE, such as:

Measurement reports (e.g. used for UE mobility)
RRC re-establishment in case of connection failure
Initial RRC connection setup (e.g. if the UE is IDLE mode and need to transition to connected)

RRC relies on PDCP/RLC/MAC protocols to guarantee lossless, in-order, duplication free delivery of RRC messages. The in-order delivery is ensured by the PDCP sequence number, meaning that PDCP only delivers an RRC message (e.g. delivers to a later above the PDCP layer) if it has a PDCP sequence number which is the next expected PDCP sequence number (i.e. the number is one more than the PDCP sequence number of last delivered message). This means that if the network loses knowledge of the next PDCP sequence number that is expected by a UE, it would not be able to send any RRC message to the UE since if the network does not guess the exact sequence number correctly the message will not be delivered by the PDCP layer in the UE to a higher layer (e.g. the RRC layer) in the UE.

In addition to the RRC protocol, the UE is also controlled by the NAS protocol which is between the UE and the core network. The NAS protocol is delivered embedded within RRC messages.

FIG. 4 illustrates an example of a control plane (CP) protocol stack 400 in NR and FIG. 5 illustrates an example of a user plane (UP) protocol stack 500 in NR, where the CU/DU split architecture is employed (where the CU is also split into CU-UP and CU-CP). Note that the CU-CP/CU-UP split is a functional split and as such the two functionalities can reside either in the same node or different node or even one of the functionalities, i.e. the CU-UP or CU-CP, for a given gNB can be physically realized in several physical nodes/entities can be distributed physically. For example, several instances of the CU-UP/CU-CP for a given gNB can exist in an operator's cloud, for redundancy or for load balancing purposes.

If a connection with a UE fails, e.g. due to radio link failure, handover failure (T304 timer expiry) or inability to comply with RRC message, integrity verification failure etc., the UE will initiate an RRC re-establishment procedure. In NR, this is captured in TS 38.331, which is incorporated herein by reference, in section 5.3.7. FIG. 6 shows an example of a RRC connection re-establishment (successful) procedure 600, and FIG. 7 shows an example of a RRC re-establishment with fallback to RRC establishment (successful) procedure 700. The purpose of the re-establishment procedure is to re-establish the RRC connection. A UE in RRC_CONNECTED state, for which AS security has been activated with SRB2 and at least one DRB setup, may initiate the RRC re-establishment procedure in order to continue the RRC connection. The connection re-establishment succeeds if the network is able to find and verify a valid UE context for the UE or, if the UE context cannot be retrieved, the network responds with an RRCSetup message as shown in FIG. 7 for example.

The network applies the procedure for example as follows:

When AS security has been activated and the network retrieves or verifies the UE context:
  re-activate AS security without changing algorithms;
  re-establish and resume SRB1;
When UE is re-establishing an RRC connection, and the network is not able to retrieve or verify the UE context:
  discard the stored AS Context and release all RBs;
  fallback to establish a new RRC connection.

If AS security has not been activated, the UE shall not initiate the procedure but instead moves to RRC_IDLE state directly, with release cause 'other'. If AS security has been activated, but SRB2 and at least one DRB are not setup, the UE does not initiate the procedure but instead moves to RRC_IDLE directly, with release cause 'RRC connection failure'.

The UE can re-establish to a node different from the one it was connected to before detecting a problem. When the target network node receives the RRCReestablishmentRequest message (e.g. illustrated in FIG. 6 or 7), it can use the ReestabUE-Identity that is included in the request message to attempt to locate the old UE context for the UE. If the target network node can locate the context, it can transmit the RRCReestablishment message to the UE and the UE will restore the old configurations. If the target network node cannot find the UE context, it has to perform a NAS recovery and instead sends an RRCSetup message to the UE as illustrated in FIG. 7 for example.

The target network node will transmit the RETRIEVE UE CONTEXT REQUEST to the source node (as defined in TS 38.423/36.423, which are incorporated herein by reference), i.e. the node to which the UE was connected before the connection failure, and the source node can respond with the RETRIEVE UE CONTEXT RESPONSE (if the UE identification and verification is successful). If successful, the RETRIEVE UE CONTEXT RESPONSE will contain the HandoverPreparationInformation message, defined in TS 38.331, that contains the UE context. Once the UE has received the RRCReestablishment message, restored some configurations (e.g. SRB1) and reestablished the connection, it will transmit the RRCReestablishmentComplete message to the network. The network will then send an RRCReconfiguration message to the UE which will restore and possibly reconfigure the rest of the configurations in the UE.

In the context of CU/DU split, the re-establishment procedure is shown in FIG. 8 (from TS 38.401, section 8.7), which shows an example of a RRC re-establishment procedure 800 in the case of CU/DU split architecture. The steps in this procedure are as follows:

1. UE sends preamble to the gNB-DU.
2. The gNB-DU allocates new C-RNTI and responds UE with Random Access Response (RAR).
3. The UE sends RRCReestablishmentRequest message to the gNB-DU, which contains old C-RNTI and old Physical Cell ID (PCI).
4. The gNB-DU includes the RRC message and the corresponding low layer configuration for the UE in the INITIAL UL RRC MESSAGE TRANSFER message and transfers to the gNB-CU. The INITIAL UL RRC MESSAGE TRANSFER message should include C-RNTI.
5. The gNB-CU includes RRCReestablishment message and transfers to the gNB-DU. If the UE requests to re-establish RRC connection in the last serving gNB-DU, the DL RRC MESSAGE TRANSFER message shall include old gNB-DU UE F1AP ID.
6. The gNB-DU retrieves UE context based on old gNB-DU UE F1AP ID, replaces old C-RNTI/PCI with new C-RNTI/PCI. It sends RRCReestablishment message to UE.
7-8. The UE sends RRCReestablishmentComplete message to the gNB-DU. The gNB-DU encapsulates the RRC message in UL RRC MESSAGE TRANSFER message and sends to gNB-CU.
9-10. The gNB-CU triggers UE context modification procedure by sending UE CONTEXT MODIFICATION REQUEST, which may include DRBs to be modified and released list. The gNB-DU responses with UE CONTEXT MODIFICATION RESPONSE message.
9'-10'. The gNB-DU triggers UE context modification procedure by sending UE CONTEXT MODIFICATION REQUIRED, which may include DRBs to be modified and released list. The gNB-CU responses with UE CONTEXT MODIFICATION CONFIRM message.
NOTE: Here it is assumed that UE accesses from the original gNB-DU where the UE contexts are available for that UE, and either step 9-10 or step 9' and 10' may exist or both could be skipped.
NOTE: If UE accesses from a gNB-DU other than the original one, gNB-CU should trigger UE Context Setup procedure towards this new gNB-DU.
11-12. The gNB-CU includes RRCReconfiguration message into DL RRC MESSAGE TRANSFER message and transfers to the gNB-DU. The gNB-DU forwards it to the UE.
13-14. The UE sends RRCReconfigurationComplete message to the gNB-DU, and gNB-DU forwards it to the gNB-CU.

The signaling radio bearers (SRBs) used for delivery of RRC messages provide lossless, duplication free, in-order delivery of RRC messages. It is the responsibility of the PDCP layer to ensure in order and duplication free delivery to layer(s) above the PDCP layer. It does this by assigning a PDCP sequence number to every message. The sequence number is transferred in the PDCP header of a PDCP message. The receiving PDCP entity (e.g. in the UE) will only deliver a RRC message within a PDCP packet to the RRC layer if the PDCP sequence number of the packet that contains the RRC message is the next expected PDCP sequence number (which is the PDCP sequence number last used plus one). If the network uses a PDCP sequence number which is smaller than the PDCP sequence number last used before the failure, the UE will consider the packet a duplicate and discard it. If the network uses a PDCP sequence which is larger than the next expected PDCP sequence number in the UE, the UE will store the message in the PDCP layer and wait for the missing packet(s) with the missing sequence number(s). For example, if the last received RRC message before the CP failure was within a PDCP packet with sequence number (SN) x, and a RRC message is received with SN x+2, the PDCP layer will wait for a PDCP packet with SN x+1 before forwarding a RRC message in the PDCP packet with SN x+2 to the RRC layer. That is, if a packet with SN x+1 is not received, the packet with SN x+2 will be stored indefinitely in the UE and its contents will not be delivered to a higher layer. Since the PDCP sequence number wraps around, the determination if an out of sequence packet is a duplicate or future out of sequence packet is based on if the packet is within our outside of the PDCP receive window.

During the initiation of the re-establishment procedure (according to section 5.3.7.2 in TS 38.331), the UE:
 resets the MAC (i.e. any pending data at the MAC level will be flushed)
 both carrier aggregation (CA) and dual connectivity (DC) are released
 all DRBs and SRBs (except SRB0, which is used for sending the re-establishment message) are suspended The UE then starts timer T311 and performs cell reselection, which could select the same primary cell that it was previously connected to, or another cell. If the timer expires before a suitable cell is found, NAS recovery has to be performed via IDLE mode. If a suitable cell is found, the UE applies default MAC and control channel configurations, starts timer T301, and sends the RRC re-establishment request message to the chosen cell (including UE identity, a security checksum called short MAC-I that is computed using the old RRC integrity that it was using before re-establishment is triggered, and a re-establishment cause, which can take one of the following values: radio link failure, reconfiguration failure, handover failure, or other failure). If timer T301 expires before the UE receives the RRCReestablishment message from the network, UE has to perform NAS recovery via IDLE mode.

On receiving the RRCReestablishment message, which contains the NCC (Next hop Chaining Count), the UE uses the NCC value to derive new user plane and control plane encryption and integrity protection keys to be used for the connection, including for verification of the integrity of the received Reestablishment message. The network always sends an RRC Reconfiguration message after the Reestablishment message (referred to as "first reconfiguration after re-establishment" in the specifications). This reconfiguration message contains a full configuration flag and thus resets the whole radio configuration (except the C-RNTI and the access stratum security configuration associated with the master key) and replaces it with a new one. Additionally, the reestablishPDCP field will be included for each SRB/DRB, which will re-establish the PDCP entity of each SRB/DRB. Re-establishment of the PDCP will result in the reconfiguration of the PDCP entities to use the new ciphering and integrity protection keys calculated on the reception of the Reestablishment message, and for the transmitting PDCP entities, to transmit any pending PDCP packets after protecting them with the new keys ("pending" here means those packets which were already sent, protected using the old security keys, but the acknowledgement of their reception was not received). Also, for SRBs, re-establishment of the PDCP means the reset of the sequence numbers to initial values.

The main reason for the use of the NCC and update of the security keys is that from a security perspective re-use the same sequence number (Count) and security key for different data should be avoided, which could otherwise happen during re-establishment as the sequence numbers of the SRBs are re-set. This is due to the ciphering principle in 3GPP networks (as shown in 3GPP TS 33.501, which is incorporated herein by reference, in figure D2.1.1-1) being based on XORing the data (plaintext block) with a security bitstream (keystream block) generated by the ciphering algorithm based on a key, sequence number etc. It could be possible to remove this security bitstream by XORing two messages which has been encrypted with the same bitstream. The remaining bits will then be just an XOR of the two original messages. If an attacker could then guess one of the messages it would automatically also be able to decode the other message. Figure D2.1.1-1 of 3GPP TS 33.501 is shown in FIG. 9.

The RRC connection re-establishment procedure can be used to resynchronize the network and the UE. It does however always lead to a reset of the user plane, meaning for instance the user plane Data Radio Bearers (DRBs) are suspended, and any packets in the lower layer state machines (e.g. RLC/MAC) are flushed. Studies show that a typical RRC connection re-establishment procedure will cause a user plane service interruption of 100 ms or more. This could be considerably longer in reality, as the re-establishment is also controlled by several timers that have configurable values (e.g. T310, which is started when detecting physical layer problems can be up to 2 seconds long, and UE will not initiate the re-establishment procedure until this timer expires). Typically, this is not a problem for normal mobile broadband (MBB) users or other users since the overall performance of connection will not be significantly affected by such a service interruption. For connections requiring URLLC however this service interruption could mean URLLC requirements, such as for example latency and/or reliability, are not fulfilled.

In URLLC communications, the survival time is the time that an application consuming an URLLC communication service may continue without an anticipated message. If communication service recovery (e.g. RRC re-establishment) is not completed before survival time expires, the end user application considers the communication service as unavailable and may for example begin taking emergency actions to recover. The survival time also puts limits on the allowed user plane interruption time (e.g. at UE mobility). The survival time is a key requirement since it puts limits on how fast the system needs to recover from a failure to avoid application downtime. If the recovery time after a communication failure is shorter than the survival time, the failure may pass unnoticed by the application. Examples of use cases with a demanding survival time include public safety drones, which may have a survival time of approximately 100 ms; and industrial automation use cases in which traffic is cyclic, with frequent small packets, typically using Industrial Ethernet. The survival time in these cases may allow loss of a single packet or a few consecutive packets. For example, Motion Control may have a survival time of 0-2 ms, PLC to PLC communication 8-48 ms and Automated Guided Vehicle (AGV) 40-500 ms.

SUMMARY

One aspect of the present disclosure provides a method in a User Equipment (UE) of providing data in a PDCP message to a layer above a PDCP layer. The method comprises receiving an indication that a PDCP message received at the UE should bypass a PDCP reordering process, and providing data in the PDCP message to a layer above a PDCP layer without using the PDCP reordering process.

Another aspect of the present disclosure provides a method in a network node of causing a User Equipment (UE) to provide data in a PDCP message to a layer above a PDCP layer. The method comprises sending an indication to a User Equipment (UE) that a PDCP message sent to the UE should bypass a PDCP reordering process at the UE to cause the UE to provide data in the PDCP message to a layer above a PDCP layer in the UE without using the PDCP reordering process.

A further aspect of the present disclosure provides apparatus in a User Equipment (UE) for providing data in a PDCP message to a layer above a PDCP layer. The apparatus comprises a processor and a memory. The memory contains instructions executable by the processor such that the apparatus is operable to receive an indication that a PDCP message received at the UE should bypass a PDCP reordering process, and provide data in the PDCP message to a layer above a PDCP layer without using the PDCP reordering process.

A still further aspect of the present disclosure provides apparatus in a network node for causing a User Equipment (UE) to provide data in a PDCP message to a layer above a PDCP layer. The apparatus comprises a processor and a memory. The memory contains instructions executable by the processor such that the apparatus is operable to send an indication to a User Equipment (UE) that a PDCP message sent to the UE should bypass a PDCP reordering process at the UE to cause the UE to provide data in the PDCP message to a layer above a PDCP layer in the UE without using the PDCP reordering process.

An additional aspect of the present disclosure provides apparatus in a User Equipment (UE) for providing data in a PDCP message to a layer above a PDCP layer. The apparatus is configured to receive an indication that a PDCP message received at the UE should bypass a PDCP reordering process, and provide data in the PDCP message to a layer above a PDCP layer without using the PDCP reordering process.

Another aspect of the present disclosure provides apparatus in a network node for causing a User Equipment (UE) to provide data in a PDCP message to a layer above a PDCP layer. The apparatus is configured to send an indication to a User Equipment (UE) that a PDCP message sent to the UE should bypass a PDCP reordering process at the UE to cause the UE to provide data in the PDCP message to a layer above a PDCP layer in the UE without using the PDCP reordering process.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 11 is a flow chart of an example of a method in a network node of causing a UE to provide data in a PDCP message to a layer above a PDCP layer;

FIG. 12 is a schematic of an example of apparatus in a User Equipment (UE) for providing data in a PDCP message to a layer above a PDCP layer; and FIG. 13 is a schematic of an example of apparatus in a network node for causing a User Equipment (UE) to provide data in a PDCP message to a layer above a PDCP layer.

DETAILED DESCRIPTION

Figure 1:
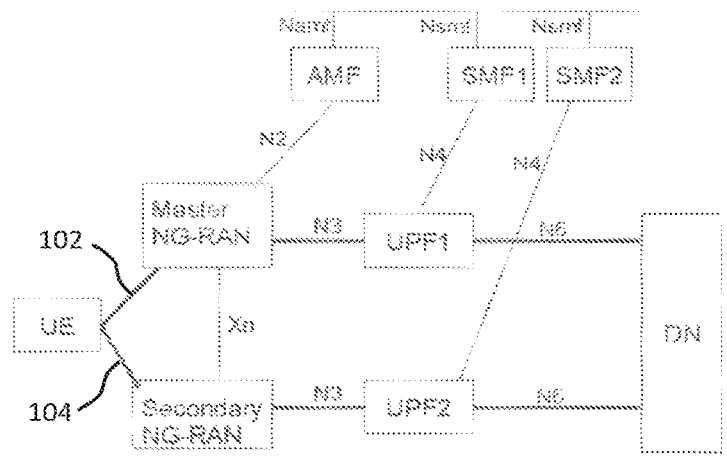
FIG. 1 shows an example scenario for end to end redundant User Plane paths using Dual Connectivity (DC)
Figure 2:
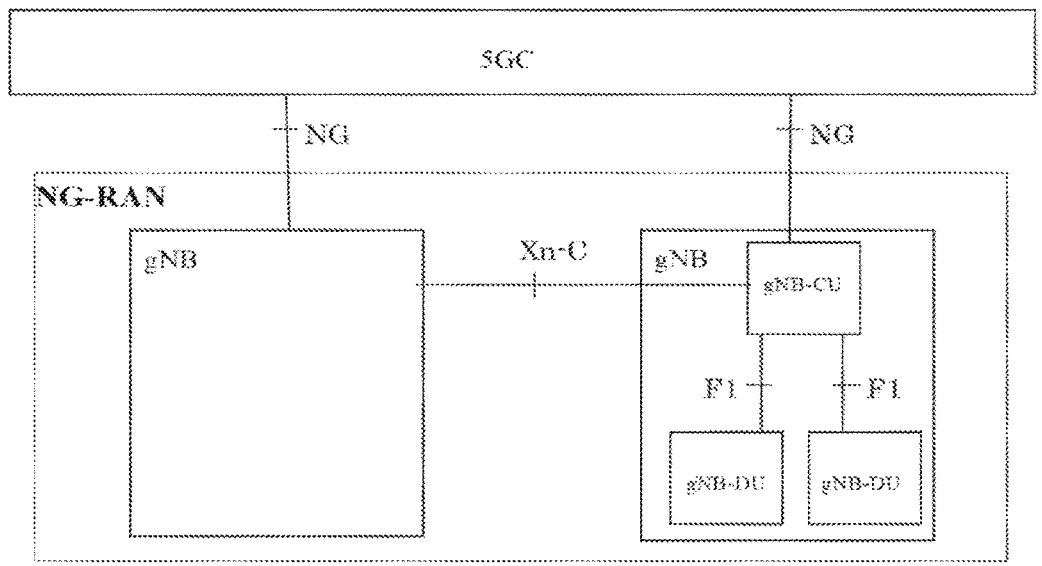
FIG. 2 illustrates an example of a 5G Radio Access Network (RAN) architecture.
Figure 3:
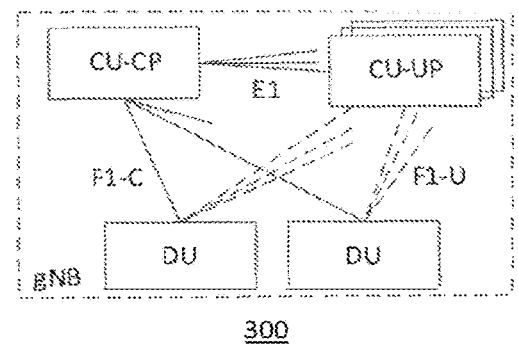
FIG. 3 illustrates a split gNodeB architecture.
Figure 4:
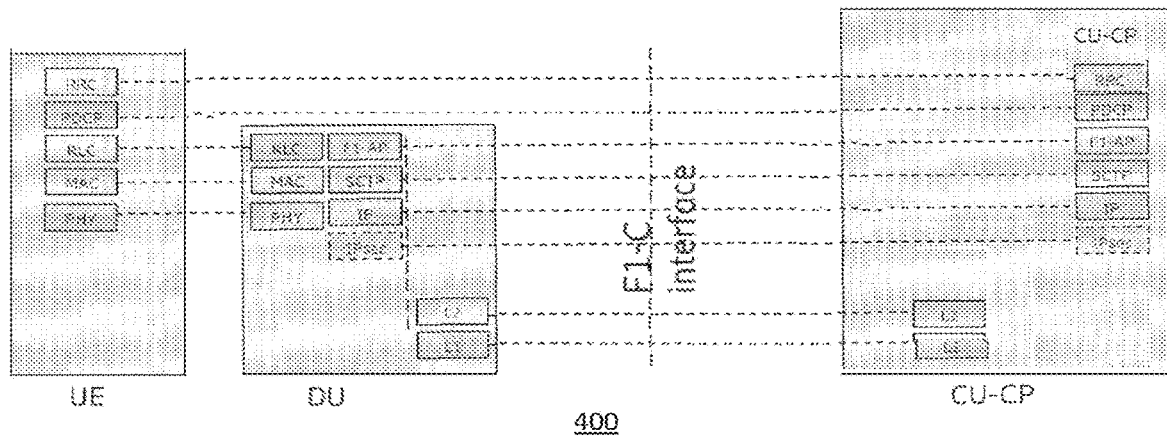
FIG. 4 illustrates an example of a control plane (CP) protocol stack.
Figure 5:
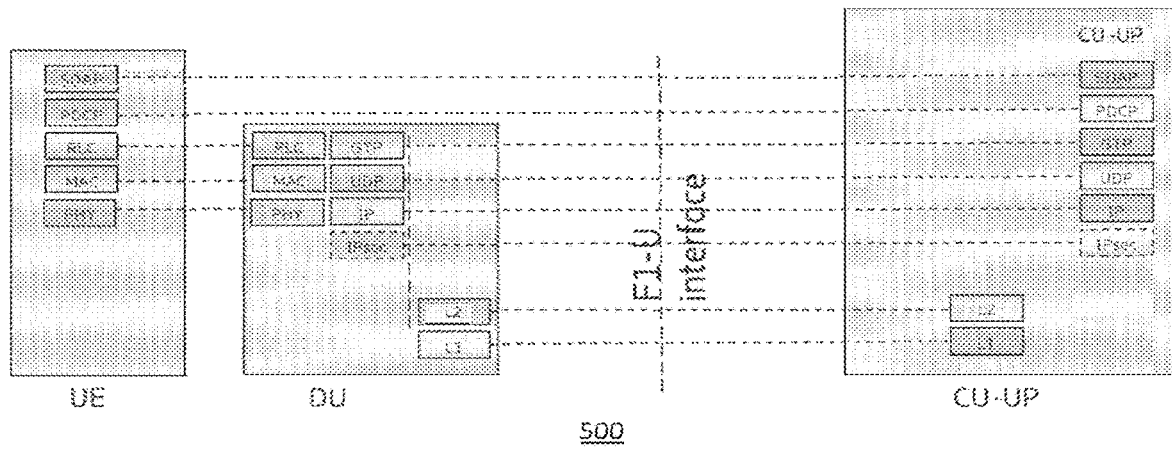
FIG. 5 illustrates an example of a user plane (UP) protocol stack.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

It would be desirable to support continuous user plane transmission for a wireless device, even if some part of the control plane connection fails on the network side, e.g. due to failed cloud infrastructure hardware and/or software. This may be particularly useful for example for wireless devices (e.g. UEs) requiring URLLC performance with low survival time.

Since the PDCP sequence number (e.g. for the PDCP entity associated with SRB1) needs to be incremented at every new RRC message, the PDCP sequence number may be persistently stored in the network so that if the control plane function that serves a UE would fail, it is possible for another control plane function, or a re-started version of the original control plane function, to take over and continue transmission of RRC messages using the PDCP sequence number that is expected by the UE.

The problem with storing the next PDPC sequence number in a persistent way for each SRB is that the storing procedure is an expensive procedure with regards to number of signaling transactions and delays. The reason for this is that multiple copies of the stored information may be generated (to handle node failures) and additional messages may be required to verify that the information is stored correctly. To improve performance, the network may only store the PDCP sequence number at predefined intervals, or not at all. Similarly, it may be desirable to not store the rest of the UE context (e.g. RRC configuration of the UE) before and after every RRC message sent to the UE, since this would also add delay and extra signaling. It would be beneficial if the UE context could only be stored once (e.g. when the UE arrives in a new cell), at predefined intervals, or after certain events (e.g. security key change or handover). In this way, signaling transactions can be made more efficient.

If the latest PDCP state and/or RRC state (e.g. latest PDCP sequence number) for a UE is not stored in the network or is not retrievable, it may be the case that if a CP node failure occurs, the network does not have the latest context of the UE and is therefore not able to communicate with the UE on a RRC level (since it does not know the correct PDCP sequence number to use).

In general, there are three possible scenarios after the failure of a control plane (CP) function at the network results in the restart or change of the control plane function that serves (is associated with) the UE:

Scenario 1: network and UE context are sync (i.e. UE has read and properly applied/compiled the last RRC message sent by the network and the next expected SN for PDCP of SRB1 will be equal to the next transmit SN at the network side). In this scenario, the next RRC message sent by the network will be received in sequence at the PDCP level and thus forwarded to a higher layer at the UE such as for example the RRC layer.

Scenario 2: network has a more up to date context: The network has updated the UE context according to the latest message it has sent and also incremented the SN for PDCP of SRB1, but the message has not arrived at the UE (e.g. CP failed even before the message has arrived at the DU or UE). Thus, the next RRC message sent by the network will have a larger SN than the UE expects and will be stored by the UE without being passed to a higher layer, while the UE keeps waiting for packets that it considers to be missing, e.g. with the missing sequence number(s).

Scenario 3: UE has a more up to date context: This happens if the network waits until it gets an acknowledgement (ACK) from the UE about the reception of the RRC message before it updates the UE context it stores, and the CP function fails before the reception of the ACK even though the UE has received/applied the RRC message and sent the ACK (but the CP failure occurred before the ACK reached the CP). In this case, the next RRC message sent by the network will have a lower SN than the UE expects, and will be considered as a duplicate and will be discarded by the UE.

Example embodiments of the present disclosure may address the problem of how the UE control plane (CP) context should be re-synchronized after a failure of a CP function in the network that was serving (was associated with) one or more UEs.

Example embodiments introduce a mechanism to re-synchronize a UE's control plane (CP) connection state in case a control plane function (e.g. a base station CU-CP) has failed on the network side, without introducing any service interruption for the user plane data radio bearers, and without significant requirements to frequently update a persistent database in the control plane node or function. Example embodiments are based on a new mechanism to signal to the UE that the PDCP re-ordering functions in the UE should be bypassed, and in some examples a new or modified RRC message to synchronize the UE RRC state with that of the network.

Advantages of embodiments as disclosed herein may include for example that Quality of Service (QoS) requirements for bearers/services with stringent latency requirements (e.g. URLLC) in a UE may be fulfilled even the in case of a temporary failure in a control plane function serving the UE in the network (e.g. due to HW or SW failure of a processing entity running the control function application). This may be done for example without introducing any extra latency or processing for the majority of signaling procedures.

Embodiments of this disclosure may include or may be implemented within one or more of the following mechanisms:
  A mechanism in the network to store a "recovery" context of the UE, or a context of the UE that may be retrieved by a new control plane function that takes over serving responsibility for UEs from an unavailable control plane function (the new control plane function may in some examples be a restart or recover of the unavailable control plane function).
  A mechanism in the network to recover from a failure of a control plane (CP) node or function involving using the stored context of the UE.
  A mechanism for resynchronizing the RRC state between the network and UE without causing any significant disturbance of the user data transmission. The mechanism includes one or more of the following:
    A mechanism to bypass a PDCP re-ordering function in the UE, and in some examples to restart PDCP sequence numbering to a given value.
    A mechanism to handle PDCP ciphering and integrity protection in a secure manner.
    mechanism to re-synchronize the RRC state in the UE.

A suitable network node, such as for example a control plane function serving or associated with the UE, can at predefined intervals (e.g. every x ms, every y seconds, every z RRC messages or messages that modify the UE RRC configuration, etc) or in response to particular events store or modify a UE recovery context in a persistent database or in another function such as another control plane function. The recovery context may only need to be updated when something significant has been changed for the UE connection, for example when a security key has been changed or when the UE has moved to a new cell. The context information could include one or more of the following:
  a) UE RRC context, including for example UE cell group configuration, radio bearer configuration, measurement configuration, PDCP/RLC/MAC/PHY configuration, security configuration (e.g. algorithms, keys) etc.
  b) UE PDCP context including PDCP counters, state, sequence numbers, etc.
  c) UE NG-C context including PDU session resource configuration (e.g. QoS parameters, flow information), RAT/frequency selection information, mobility restrictions, slice information, etc.
  d) UE RAN user plane (UP) context, including information about NG-U as well as which CU-UP is serving the UE. Could also include GTP TEID information for GTP tunnels established between the DU and CU-UP, and between the CU-UP and Core Network (UPF).

In some examples, the complete UE context may not be stored at every transaction, so the context information may not be up to date. Storing the context at every transaction has multiple drawbacks. It may cause significant increase the processing/storage required by the network control function for every UE, especially if multiple copies of the updated entry are created for redundancy purposes an/or writes to the database are acknowledged. It may also delay critical procedures since the storage of the updated context may be completed prior to configuring the UE to avoid situations where the UE configuration is different from the stored context.

If a control plane node or function is unavailable (e.g. fails), it is assumed some function in the network detects the unavailability of the CP node/function and triggers the recovery of the UE context. This could include starting a new CP function which after restart fetches the UE context from the database. This could alternatively include where the handling of the control plane functions for the UE is taken over by another CP node or function. In the latter case, this other CP function could fetch the context, or if it was assigned as a backup function and contexts and updates were already stored in this other CP function, no fetching would be needed.

Some examples of this disclosure include a mechanism in PDCP whereby an RRC message (or more generally, data in a PDCP message) is delivered to a layer above (e.g. immediately above) the PDCP layer, e.g. the RC layer, even if the network has no knowledge of the next expected PDCP sequence number in the UE for the signaling radio bearers. Using this mechanism, in some examples, the network could send an RRC reconfiguration message to resync the UE context to the latest one that was sent by the network. PDCP message is used interchangeably herein with PDCP packet.

Figure 10:
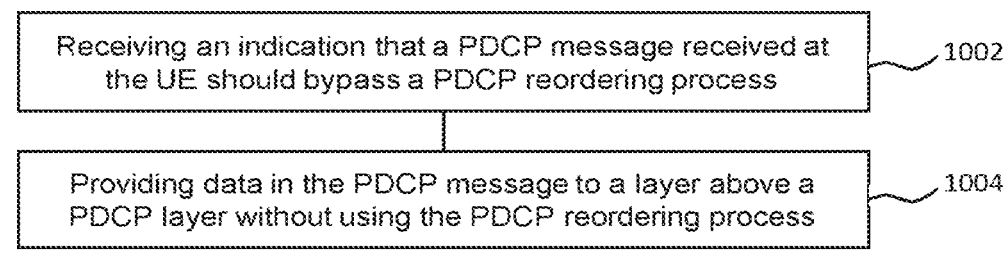
FIG. 10 is a flow chart of an example of a method in a UE of providing data in a PDCP message to a layer above a PDCP layer.

FIG. 10 is a flow chart of an example of a method 1000 in a User Equipment (UE) of providing data in a PDCP message to a layer above a PDCP layer. The layer above the PDCP layer may be for example a RRC layer in the UE. The data therefore may be for example a RRC message within the PDCP message. The method 1000 comprises, in step 1002, receiving an indication that a PDCP message received at the UE should bypass a PDCP reordering process. The method 1000 also comprises, in step 1004, providing data in the PDCP message to a layer above a PDCP layer without using the PDCP reordering process. In some examples, the indication and the PDCP message may be received from a network node, such as for example a base station distributed unit (DU), base station central unit (CU) or base station central unit-control plane (CU-CP).

Thus for example a RRC message may be delivered to a higher layer in the UE, such as the RRC layer, even if the network is not aware of the next sequence number of a PDCP message expected by the UE. In some examples, the PDCP message may relate to SRB1 PDCP messages, or messages for any particular SRB.

In some examples, providing the data in the PDCP message to the layer above the PDCP layer without using the PDCP reordering process in step 1004 may comprise providing the data in the PDCP message to the layer above the PDCP layer without determining whether a sequence number of the PDCP message is a next expected sequence number. Thus for example the indication may cause the UE to skip the process of determining whether the sequence number is the next expected number, or may cause the UE to ignore the result of the process.

The indication may be received in the PDCP message or a previous PDCP message preceding (e.g. immediately preceding) the PDCP message. Thus, for example, where the previous PDCP message contains the indication, the UE may determine that the next received message should skip the reordering process. In some examples, the PDCP message or the previous PDCP message may comprise a PDCP control PDU or a PDCP data PDU, and the indication is received in the PDCP control PDU or in a header of the PDCP data PDU. In some examples, the indication comprises a predetermined sequence number of the PDCP message or of the preceding PDCP message. Thus, for example, when the UE determines that a received PDCP message has this predetermined sequence number, such as for example a reserved value for the sequence number, the UE may determine that this is an indication that the received PDCP message (and/or the next one) should skip the reordering process and be passed to the layer above the PDCP layer.

In some examples, the method 1000 comprises, in response to the indication, setting a next expected PDCP message sequence number to a predetermined value, wherein the predetermined value comprises a default value, a reserved value, a value indicated by the indication, or a sequence number of the PDCP message. So, for example, the indication may cause a "reset" of the PDCP sequence number to the predetermined value (which may be the sequence number of the PDCP message in some examples). In some examples, the PDCP message has a sequence number equal to or immediately following the predetermined value.

Figure 6:
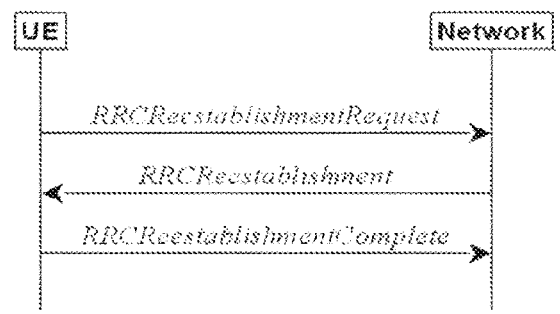
FIG. 6 shows an example of a RRC connection re-establishment (successful) procedure.
Figure 7:
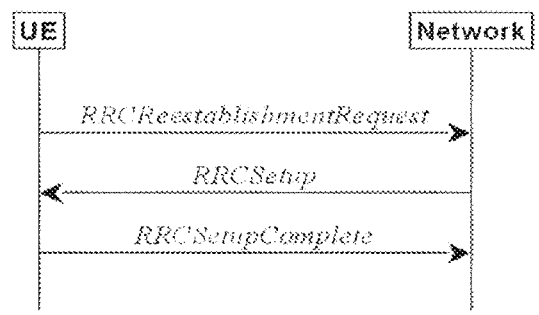
FIG. 7 shows an example of a RRC re-establishment with fallback to RRC establishment (successful) procedure.
Figure 8:
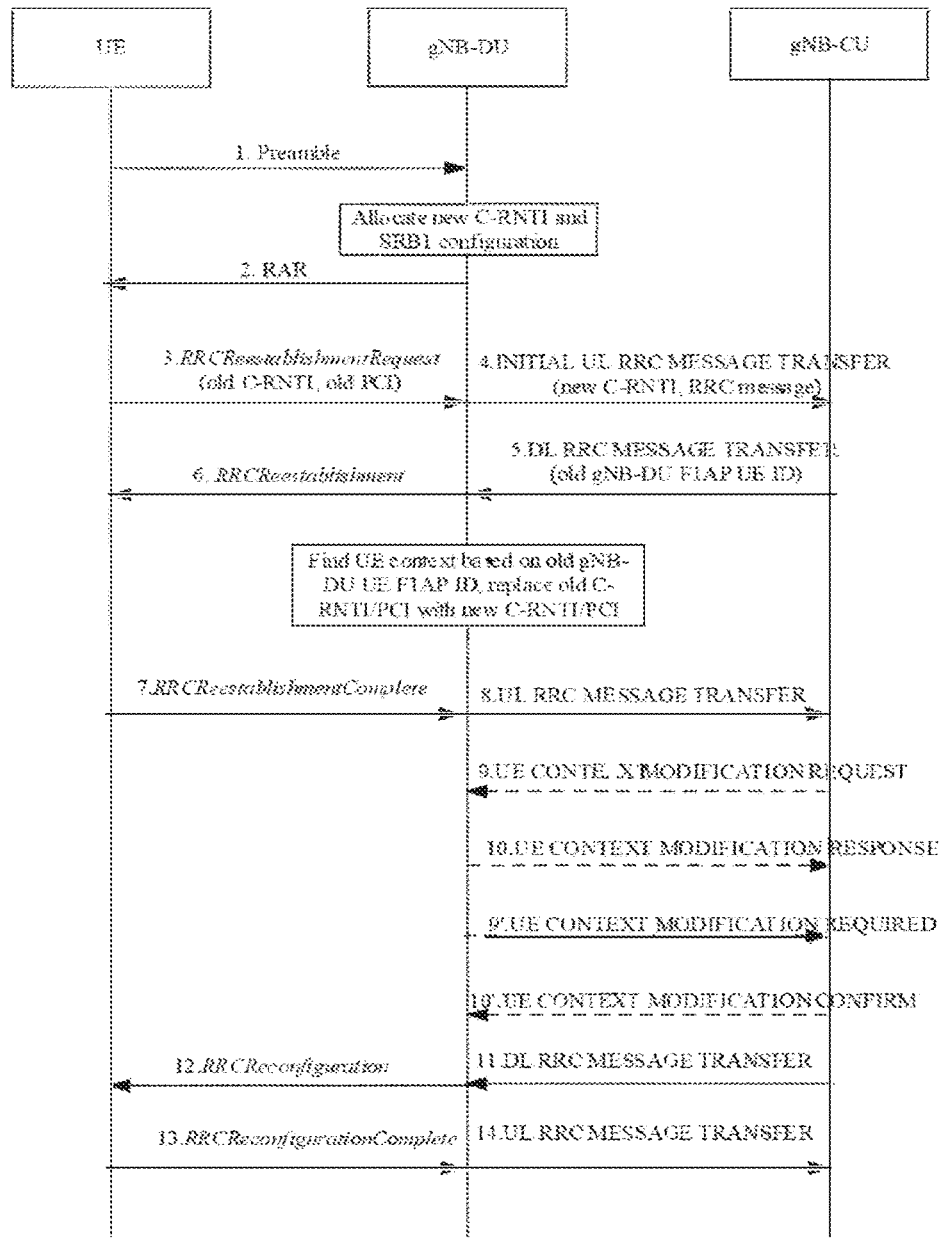
FIG. 8 shows an example of a RRC re-establishment procedure in case of CU/DU split architecture.

In an example, the indication (e.g. an information element, IE, or flag) may be included in the PDCP packet header, for example by using one or more currently reserved bits in the PDCP header shown as R in the FIG. 6.2.2.1-1 in 3GPP TS 38.323, which is incorporated herein by reference. The indication indicates that this is a packet that should be forwarded (or the data should be passed) to an upper layer, such as the RRC layer, and not be subject to a reordering procedure that may otherwise wait for out of order packet (if the SN of the received PDCP packet is greater than the next SN that the UE was expecting) or discard the packet due to duplicate detection (if the SN of the packet is smaller than the next SN that the UE was expecting). In some examples, the UE can also set the next expected SN for the next PDCP message to be the SN of the received PDCP packet plus one, and hence re-synchronize the PDCP SN between the UE and the network.

In another example, the network may transmit a PDCP control PDU that includes a SN, and indicates that the UE shall consider the indicated SN (or SN+1) to be the next expected SN. This can be implicitly used to refer to the SN of PDCP packets for SRB1, or in some examples the PDCP message/packet may include an additional field in the control PDU specifying the SRB/DRB identity that this SN relates to. In this case, the network may then in some examples send a normal PDCP data PDU with the next expected PDCP SN to resume SRB operation.

In another example, the network may use a specific SN is reserved for such cases, e.g. the predetermined value referred to above. This value may for example be specified in PDCP/RRC specifications or communicated to the UE, for example in the PDCP or RRC configuration. The predetermined Sn value may in some examples not be used for normal operation (e.g. it may be a highest possible SN value or zero, which is skipped during wraparound of the SN in normal operation). The predetermined SN value can be the same for any SRB/DRB, or a different value can be set or used for different SRBs/DRBs.

The data may in some examples comprise an instruction to modify a configuration of the UE, such as for example an RRC message or an instruction to modify the RRC configuration of the UE. The configuration of the UE may comprise for example one or more of a UE RRC context, a UE PDCP context for a control plane, a UE NG-C interface context, a UE control plane context, a UE user plane context and one or more pending RRC procedures.

In some examples, the data comprises an RRC message, and providing the data in the PDCP message to the layer above the PDCP layer comprises providing the data to a RRC layer. The message may thus comprise for example an instruction to apply at least part of a new or previous RRC configuration, and the method 1000 comprises applying the at least part of the new or previous RRC configuration. Additionally or alternatively, the message comprises an instruction for the UE to perform a RRC reconfiguration with sync, and the method 1000 comprises performing the RRC reconfiguration with sync. In some examples, performing the RRC reconfiguration with sync comprises performing the RRC reconfiguration with sync without flushing a MAC layer.

Examples of this disclosure may also employ a mechanism on the RRC layer to re-synchronize the RRC state between the UE and the network, as the network (or the CP function taking over responsibility for control plane functions for the UE) may not know the latest RRC configuration that is being used by the UE. In one example, the network sends an RRC message to the UE which includes an indication that the UE should disregard the latest RRC configuration or parts of the latest RRC configuration and instead apply a new configuration (or parts of a new configuration) provided in an RRC message to the UE. Where parts of the RRC configuration are applied, other parts may remain unchanged from the latest configuration. Therefore, the UE may for example store one or more previous versions of the UE context (or RRC configuration) even after updating on received RRC messages during normal operations. In some examples, stored previous RRC configurations or UE contexts can be indexed using the SN of the PDCP packet (or last PDCP packet) that contained the RRC message that contained or modified those configurations. In another example, the indication referred to above could indicate that a full configuration should be applied by the UE, which should thus disregard the old (current) configuration and apply a new configuration as indicated in the message.

In some examples the UE, in response to receiving the indication in step 1002 of the method 100 described above, may respond to the network with an indication of the latest valid configuration that the UE is using or has stored. This could be for example one or more of the latest RRC transaction ID of the RRC message it has applied before the reception of this message, the PDCP SN of the packet that carried the latest RRC message, a checksum computed based on the full RRC reconfiguration available at the UE, the full UE configuration, etc. This way, the network will be able to verify if the UE and network configurations are in sync, and if not, be able to send the configuration (or partial configuration) to bring the UE and network into synchronization.

In some examples, the method 1000 may comprise verifying the integrity of at least part of the PDCP message using an algorithm based on the received indication. For example, the algorithm may be modified, or an input to the algorithm may be modified, in response to the received indication.

The method 1000 comprises, in some examples, generating a new integrity verification key for verifying integrity of PDCP messages in response to receiving the indication. Thus, for example, the method 1000 may comprise receiving a further PDCP message, attempting to verify integrity of the further PDCP message using a previous integrity verification key, and if attempting to verify integrity of the further PDCP message using a previous integrity verification key fails, verifying the integrity of the further PDCP message using the new integrity verification key.

From a security perspective, it may be preferable to avoid re-use of the same sequence number and security key for different data. One reason for this is that since the ciphering in 3GPP networks (as shown in figure D2.1.1-1 in 3GPP TS 33.501) is based on XORing the data (plaintext block) with a security bitstream (keystream block) generated by the ciphering algorithm based on an encryption key, sequence number etc. It could be possible to remove this security bitstream by XORing two messages which have been encrypted with the same bitstream (or part of the bitstream). The remaining bits will then be just an XOR of the two original messages. If an attacker could then guess one of the messages it would also be possible to decode the other message. As a result, embodiments of this disclosure make particular consideration of security. For example, the network may always ensure that a PDCP sequence number (or Count) used for SRB1 (or any other SRB or bearer) after the restart or change of the CP node serving or associated with a UE is higher than the last used PDCP sequence number (or Count) for the UE. This solution would require that the network stores or calculates a PDCP sequence number (or Count) that is larger than the PDCP sequence number that is currently used. If the PDCP sequence number is significantly larger, it may not be required to update the stored PDCP sequence number as often. In a particular example, the highest possible SN can be reserved only for this use (e.g. it is the predetermined or reserved PDCP sequence number referred to above) and not used during normal operation.

Figure 9:
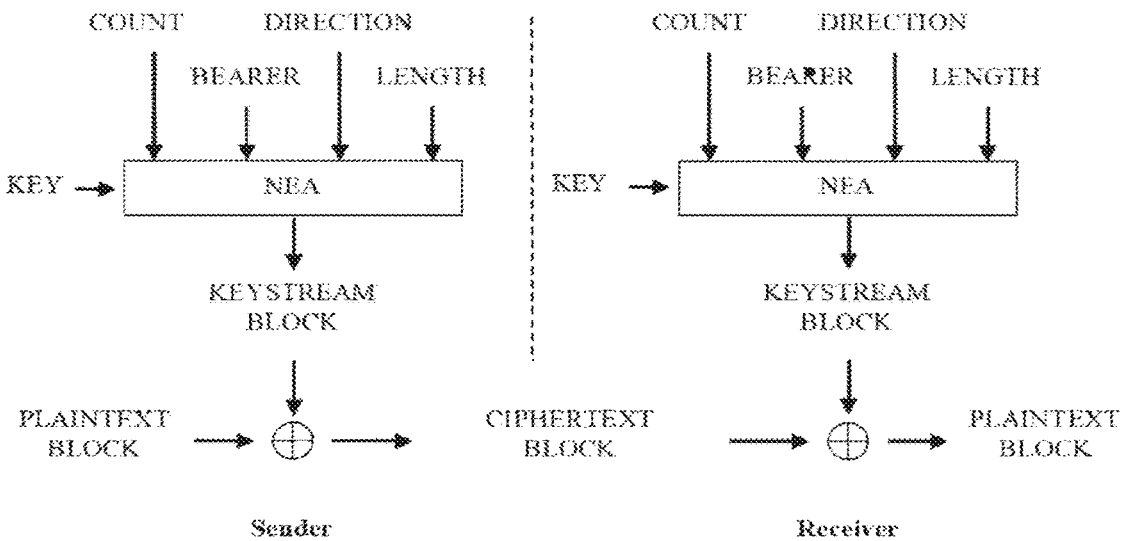
FIG. 9 shows Figure D2.1.1-1 of 3GPP TS 33.501.

An alternative example that does not require the usage of a specific or reserved PDCP sequence number as described above is to introduce one or more extra inputs to the ciphering (or integrity protection) algorithm, which modify the algorithm as suggested above (e.g. modify the "sender" algorithm shown in FIG. 9). The one or more extra inputs may include for example an X bit counter that is incremented every time the UE receives the indication (e.g. the indication referred to in step 1002 of the method 1000). Therefore, it may not matter if the PDCP sequence number is reset to a value that has been previously used, since the generated bitstream for ciphering will be different due to the changing value of X. Additionally or alternatively, the one or more extra inputs may include for example a single bit, indicating that reset of the sequence number (or use of a sequence number where the expected sequence number is unknown) has occurred. In this example, the network may in some cases trigger a refresh of the UE security key prior to the next sequence number reset, to avoid reusing the same sequence number and bit indicating that reset of the sequence number has occurred. In any case, for example, the modification to the ciphering, encryption or integrity protection algorithm may be mirrored by the UE at a decryption or integrity verification algorithm. In some examples, the UE may first attempt to decrypt or verify integrity of a PDCP message with an unmodified algorithm, and then with a modified algorithm (e.g. a modified "receiver" algorithm shown in FIG. 9) if unsuccessful (e.g. by incrementing the UE's stored X value or setting/resetting the single bit).

In an alternative example, instead of using extra input to the ciphering, encryption or integrity protection algorithm, the indication (e.g. that sent in step 1002 of the method 1000 described above) may trigger a key refresh in the UE. For example, the UE may perform a "horizontal" key refresh by calculating a new key KeNB/KgNB or a new KRRCint or a new KRRCenc based on using the old key KeNB/KgNB or old KRRCint/KRRCenc as input to a key generation function. Alternatively, the UE may perform a "vertical" key refresh where the UE calculates a new key KeNB/KgNB based on using the NH parameters (e.g. a Next Hop, NH, key and a Next hop Chaining Counter, NCC) as input to a key generation function. In order to not disturb the user plane traffic, in some examples, the UE can continue to use the previous key for user plane communication until it receives an indication to switch to the new key. In order to ensure that the activation of the new key for the user plane is seamless, it may be possible to send an indication e.g. in the user plane PDCP, RLC and/or MAC packet header to indicate that the new key is used to encrypt the packet. Alternatively, for example, the network may change the Logical Channel ID (LCID) for the user plane radio bearers so that any packets using the old key use the previous LCID and packets using the new key use the new LCID. The UE will therefore be aware which key has been used for a given packet based on the LCID. Similarly, the network can determine the same for an uplink packet in the same manner. The UE or network may in some examples attempt to use the previous key first to decrypt or verify integrity of a packet, and then attempt with the new key if unsuccessful. In some examples, indicator may be included in the last packet that was encrypted or integrity protected using the previous key, and then when that packet is delivered to upper layers in-order, the UE can revert to using the new keys.

In some examples an indicator may be included in a packet or message at layer lower than the PDCP layer, such as for example the RLC or MAC layer, that special handling is to be made for this packet or message when it comes to security. For example, this indicator may indicate to the UE that the extra input or bit such as that suggested above should be used when decrypting or verifying the integrity of the packet or message.

FIG. 11 is a flow chart of an example of a method 1100 in a network node of causing a User Equipment (UE) to provide data in a PDCP message to a layer above a PDCP layer (e.g. a RRC layer). The method comprises, in step 1102, sending an indication to a User Equipment (UE) that a PDCP message sent to the UE should bypass a PDCP reordering process at the UE to cause the UE to provide data in the PDCP message to a layer above a PDCP layer in the UE without using the PDCP reordering process. In some examples, the UE may perform the method 1000 of FIG. 10 as described above. The network node may comprise for example a base station distributed unit (DU), base station central unit (CU) or base station central unit-control plane (CU-CP) that is associated with or serving the UE. In some examples, the data comprises an RRC message, and the layer above the PDCP layer in the UE comprises a RRC layer in the UE.

Causing the UE to provide the data in the PDCP message to the layer above the PDCP layer without using the PDCP reordering process in step 1102 may for example comprise causing the UE to provide the data in the PDCP message to the layer above the PDCP layer without determining whether a sequence number of the PDCP message is a next expected sequence number.

The indication may be sent to the UE in the PDCP message or a previous PDCP message sent to the UE preceding the PDCP message in some examples. The PDCP message or the previous PDCP message may for example comprise a PDCP control PDU or a PDCP data PDU, and the indication is sent in the PDCP control PDU or in a header of the PDCP data PDU. The indication may comprise for example a predetermined sequence number of the PDCP message or of the preceding PDCP message.

In some examples, the indication comprises an instruction to the UE to set a next expected PDCP message sequence number to a predetermined value, wherein the predetermined value comprises a default value, a reserved value, a value indicated by the indication, or a sequence number of the PDCP message. The PDCP message has a sequence number equal to or immediately following the predetermined value in some examples.

In some examples, the data comprises an instruction to modify a configuration of the UE, such as for example a RRC configuration. The configuration of the UE may comprise for example one or more of a UE RRC context, a UE PDCP context for a control plane, a UE NG-C interface context, a UE control plane context, a UE user plane context and one or more pending RRC procedures.

The data may comprise an RRC message, and the layer above the PDCP layer comprises a RRC layer. Thus for example the message may comprise an instruction to the UE to apply at least part of a new or previous RRC configuration. Additionally or alternatively, for example, the message comprises an instruction to the UE to perform a RRC reconfiguration with sync, or an instruction to the UE to perform a RRC reconfiguration with sync without flushing a MAC layer.

The method 1100 may in some examples comprise determining that a control plane function serving the UE is unavailable, wherein the indication is sent to the UE in step 1102 in response to determining unavailability of the control plane function. The network node may in some examples encrypting at least part of the PDCP message using a modified encryption algorithm or a modified input to an encryption algorithm in response to determining that the control plane function is unavailable. Thus for example the UE may decrypt and/or verify the integrity of the PDCP message using a modified integrity verification algorithm as suggested above or a modified decryption algorithm. The method 1100 may also comprise for example generating a new encryption key for encrypting PDCP messages sent to the UE after the indication in response to determining that the control plane function is unavailable. The method 1100 may also comprise for example sending the PDCP message to the UE.

Determining that the control plane function associated with the UE is unavailable (e.g. failure of the control plane function) may comprise for example receiving a notification from a further network node that the control plane function is unavailable, or determining that one or more expected messages or acknowledgements have not been received from the control plane function.

FIG. 12 is a schematic of an example of apparatus 1200 in a User Equipment (UE) for providing data in a PDCP message to a layer above a PDCP layer. The apparatus 1200 comprises processing circuitry 1202 (e.g. one or more processors) and a memory 1204 in communication with the processing circuitry 1202. The memory 1204 contains instructions executable by the processing circuitry 1202. The apparatus 1200 also comprises an interface 1206 in communication with the processing circuitry 1202. Although the interface 1206, processing circuitry 1202 and memory 1204 are shown connected in series, these may alternatively be interconnected in any other way, for example via a bus.

In one embodiment, the memory 1204 contains instructions executable by the processing circuitry 1202 such that the apparatus 1200 is operable to receive an indication that a PDCP message received at the UE should bypass a PDCP reordering process, and provide data in the PDCP message to a layer above a PDCP layer without using the PDCP reordering process. In some examples, the apparatus 600 is operable to carry out the method 1000 described above with reference to FIG. 10.

FIG. 13 is a schematic of an example of apparatus 1300 in a network node for causing a User Equipment (UE) to provide data in a PDCP message to a layer above a PDCP layer. The apparatus 1300 comprises processing circuitry 1302 (e.g. one or more processors) and a memory 1304 in communication with the processing circuitry 1302. The memory 1304 contains instructions executable by the processing circuitry 1302. The apparatus 1300 also comprises an interface 1306 in communication with the processing circuitry 1302. Although the interface 1306, processing circuitry 1302 and memory 1304 are shown connected in series, these may alternatively be interconnected in any other way, for example via a bus.

In one embodiment, the memory 1304 contains instructions executable by the processing circuitry 1302 such that the apparatus 1300 is operable to send an indication to a User Equipment (UE) that a PDCP message sent to the UE should bypass a PDCP reordering process at the UE to cause the UE to provide data in the PDCP message to a layer above a PDCP layer in the UE without using the PDCP reordering process. In some examples, the apparatus 600 is operable to carry out the method 1100 described above with reference to FIG. 11.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order

The invention claimed is:

1. A method in a User Equipment (UE) of providing data in a PDCP message to a layer above a PDCP layer, the method comprising:
   receiving an indication that a PDCP message received at the UE should bypass a PDCP reordering process; and
   providing data in the PDCP message to a layer above a PDCP layer without using the PDCP reordering process; and
   setting a next expected PDCP message sequence number to a predetermined value in response to the indication, wherein the predetermined value comprises a default value, a reserved value, a value indicated by the indication, or a sequence number of the PDCP message.

2. The method of claim 1, wherein providing the data in the PDCP message to the layer above the PDCP layer without using the PDCP reordering process comprises providing the data in the PDCP message to the layer above the PDCP layer without determining whether a sequence number of the PDCP message is a next expected sequence number.

3. The method of claim 2, wherein the PDCP message or a previous PDCP message comprises a PDCP control PDU or a PDCP data PDU, and the indication is received in the PDCP control PDU or in a header of the PDCP data PDU.

4. The method of claim 1, wherein the indication is received in the PDCP message or a previous PDCP message preceding the PDCP message.

5. The method of claim 4, wherein the indication comprises a predetermined sequence number of the PDCP message or of the preceding PDCP message.

6. The method of claim 1, wherein the PDCP message has a sequence number equal to or immediately following the predetermined value.

7. The method of claim 1, wherein the data comprises an instruction to modify a configuration of the UE.

8. The method of claim 7, wherein the configuration of the UE comprises one or more of a UE RRC context, a UE PDCP context for a control plane, a UE NG-C interface context, a UE control plane context, a UE user plane context and one or more pending RRC procedures.

9. The method of claim 8, wherein the message comprises an instruction to apply at least part of a new or previous RRC configuration, and the method comprises applying the at least part of the new or previous RRC configuration.

10. The method of claim 1, wherein the data comprises an RRC message, and providing the data in the PDCP message to the layer above the PDCP layer comprises providing the data to a RRC layer.

11. The method of claim 1, further comprising verifying the integrity of at least part of the PDCP message using an algorithm based on the received indication.

12. The method of claim 1, further comprising generating a new integrity verification key for verifying integrity of PDCP messages in response to receiving the indication.

13. The method of claim 12, further comprising receiving a further PDCP message, attempting to verify integrity of the further PDCP message using a previous integrity verification key, and if attempting to verify integrity of the further PDCP message using a previous integrity verification key fails, decrypting the further PDCP message using the new decryption key.

14. The method of claim 1, wherein the indication and the PDCP message are received from a network node.

15. The method of claim 14, wherein the network node comprises a base station distributed unit (DU), base station central unit (CU) or base station central unit-control plane (CU-CP).

16. A method in a network node of causing a User Equipment (UE) to provide data in a PDCP message to a layer above a PDCP layer, the method comprising:
   sending an indication to a User Equipment (UE) that a PDCP message sent to the UE should bypass a PDCP reordering process at the UE to cause the UE to provide data in the PDCP message to a layer above a PDCP layer in the UE without using the PDCP reordering process, wherein the indication comprises an instruction to the UE to set a next expected PDCP message sequence number to a predetermined value, wherein the predetermined value comprises a default value, a reserved value, a value indicated by the indication, or a sequence number of the PDCP message.

17. The method of claim 16, wherein causing the UE to provide the data in the PDCP message to the layer above the PDCP layer without using the PDCP reordering process comprises causing the UE to provide the data in the PDCP message to the layer above the PDCP layer without determining whether a sequence number of the PDCP message is a next expected sequence number.

18. The method of claim 16, wherein the indication is sent to the UE in the PDCP message or a previous PDCP message sent to the UE preceding the PDCP message.

19. The method of claim 18, wherein the PDCP message or the previous PDCP message comprises a PDCP control PDU or a PDCP data PDU, and the indication is sent in the PDCP control PDU or in a header of the PDCP data PDU.

20. The method of claim 16, wherein the data comprises an instruction to modify a configuration of the UE.

21. The method of claim 20, wherein the configuration of the UE comprises one or more of a UE RRC context, a UE PDCP context for a control plane, a UE NG-C interface context, a UE control plane context, a UE user plane context and one or more pending RRC procedures.

22. The method of claim 16, wherein the data comprises an RRC message, and the layer above the PDCP layer comprises a RRC layer.

23. The method of claim 16, further comprising determining that a control plane function associated with the UE is unavailable, wherein determining that the control plane function associated with the UE is unavailable comprises receiving a notification from a further network node that the control plane function is unavailable, or determining that one or more expected messages or acknowledgements have not been received from the control plane function.

24. The method of claim 16, further comprising determining that a control plane function associated with the UE is unavailable, wherein determining that the control plane function is unavailable comprises determining failure of the control plane function.

* * * * *